United States Patent [19]
Bond, Jr et al.

[11] 3,764,589
[45] Oct. 9, 1973

[54] ALPHA-OLEFIN INTERPOLYMERS FORMED WITH UNSATURATED ORGANO SILANES

[75] Inventors: William C. Bond, Jr; Harold J. Wahlborg, both of Baton Rouge, La.

[73] Assignee: Copolymer Rubber & Chemical Corporation, Baton Rouge, La.

[22] Filed: June 17, 1971

[21] Appl. No.: 154,196

[52] U.S. Cl. ......... 260/80.71, 117/161 ZA, 260/25, 260/17.4 GC, 260/41 C, 260/SI, 260/46.5 UA, 260/47 UP, 260/80 P, 260/88.1 R, 260/887, 260/897 R, 260/897 B, 260/897 C
[51] Int. Cl. ............................................. C08f 15/04
[58] Field of Search .................... 260/80.71, 88.1 R, 260/17.4 CL, 80 P, 41 C, 41 S, 41 I, 46.5 UA, 47 UP, 2 S

[56] References Cited
UNITED STATES PATENTS

| 3,177,166 | 4/1965 | Gregory | 260/47 UP |
| 3,198,766 | 8/1965 | Nitzche et al. | 260/46.5 UA |
| 3,444,134 | 5/1969 | Soldatos | 260/47 UP |
| 3,644,306 | 2/1972 | Longi et al. | 260/80.71 |
| 3,577,399 | 5/1971 | Mortimer | 260/88.1 |
| 3,375,236 | 3/1968 | Vande Castle | 260/80.71 |

FOREIGN PATENTS OR APPLICATIONS

| 1,001,838 | 8/1965 | Great Britain | 260/80.71 |

Primary Examiner—William H. Short
Assistant Examiner—Edward Woodberry
Attorney—McDougall, Hersh & Scott

[57] ABSTRACT

The preparation of interpolymers of ethylene by interpolymerization of ethylene, an unsaturated organo silane and a monoolefin and with or without a polyene in the presence of a Ziegler type catalyst, particularly to produce uniquely modified polymers from the post-reaction between nucleophiles and the hydrolyzable groups that remain attached to the silicon atom in the interpolymer.

27 Claims, No Drawings

ALPHA-OLEFIN INTERPOLYMERS FORMED WITH UNSATURATED ORGANO SILANES

The invention relates to new and improved α-olefin interpolymers and to methods for the preparation of same and more particularly to the preparation of new and improved vulcanizable α-olefin interpolymers having a number of unique properties and characteristics.

It is an object of this invention to produce and provide a method for producing interpolymers of ethylene, an unsaturated organo silane and olefinic compounds which then utilize the hydrolyzable groups on the silane portion of the interpolymer in a post-polymerization reaction to form a variety of interesting and uniquely modified interpolymers which cannot be formed directly during the polymerization. These modified interpolymers have many novels applications and properties not normally associated with ethylene interpolymers.

The interpolymers of this invention are prepared by the interpolymerization of a first monomeric component in the form of ethylene, and a second monomeric component in the form of an unsaturated organo silane having the general formula $R_nSiX_{4-n}$ in which X is a highly hydrolyzable group other than an oxygen containing group, as represented by a halogen such as chlorine, bromine or iodine, a tertiary amino group, and the like, R is a group selected from the group consisting of hydrogen, an organic aliphatic group such as methyl, ethyl, propyl, isopropyl, butyl, amyl, hexyl, octadecyl, and the like $C_1$–$C_{18}$ hydrocarbons, an organic alicyclic group such as cyclopentyl, cyclohexyl and the like, an aryl or alkaryl group such as phenyl, mono- and polyalkyl phenyls such as tolyl, xylyl, mesitylyl, mono-, di- and triethyl phenyls, naphthyl, mono- and polyalkyl naphthyls such as methyl naphthyl, diethyl naphthyl, etc., and anthracyl, and aralkyl group such as benzyl, 2-phenylethyl, and the like, a heterocyclic radical, and in which at least one of the R groups is an organic group having at least one carbon-to-carbon double bond, such as allyl, vinyl and the like, and in which the unsaturated organic group is preferably a norbornenyl or alkyl substituted norbornenyl group, and in which said groups may be substituted or unsubstituted, halogen substituted or unsubstituted, and in which $n$ is a number of from 1 to 3, and a third monomeric component in the form of monoolefins, preferably an α-monoolefin containing from 3 to 20 carbon atoms, and preferably 3 to 10 carbon atoms, as represented by the preferred component propylene. If desired a fourth monomeric component in the form of a polyene may also be included.

The silicon containing compounds as mentioned above are usually called unsaturated organosilanes but they can also be called silyl substituted olefins depending on the complexity of the organic substituents on the silicon atom. It will be noted later that the nomenclature has followed the organosilane precedent when discussing simple silicon substituted olefins but when specific norbornene compounds were mentioned the silyl-organic type nomenclature has been used.

It will be understood that the second monomer may comprise one or a mixture of unsaturated organosilanes of the type described and that the third monomeric component may be formed of one or more olefins having from 3 to 20 carbon atoms and that the fourth monomer in the form of a polyene may constitute one or a number of polyenes of the types which will hereinafter be described in greater detail.

The second monomer or group of monomeric compounds, identified as an unsaturated organosilane, may be represented by the general formula $R_nSiX_{4-n}$ in which $n$ is a number from 1 to 3, X is a highly hydrolyzable group such as a halogen group, a tertiary amino group and the like, and R is hydrogen or an organic group as previously described, in which at least one of the R groups is an organic group containing one or more olefinic groups, in which the second monomer may be represented by such compounds as vinyltrichlorosilane, allyltrichlorosilane, vinyldichlorosilane, allylmethyldichlorosilane, allyldimethylchlorosilane and the like; an unsaturated aryl or alkaryl silane such as styryltrichlorosilane and the like, but it is preferred to make use of a silane in which an unsaturated organo group on the silicon atom is a norbornenyl group as represented by 5-trichlorosilyl-2-norbornene, 5-methyldichlorosilyl-2-norbornene, 5-dimethylchlorosilyl-2-norbornene, 6-methyl-5-trichlorosilyl-2-norbornene, 7-methyl-5-trichlorosilyl-2-norbornene, 5-trichlorosilylmethyl-2-norbornene, 5-phenyldichlorosilyl-2-norbornene, 5-tribromosilyl-2-norbornene, 6-chloro-5-trichlorosilyl-2-norbornene and 5,6-bis(trichlorosilyl)-2-norbornene.

The third monomeric compound can be an α-olefin having from 3 to 20 carbon atoms and may be represented by the general formula $R - CH = CH_2$, wherein R is a $C_1$ to $C_{18}$ alkyl radical which may be branched or straight chained, halogen substituted or unsubstituted, and which may be represented by the compounds propylene, 1-butene, 1-pentene, 1-hexene, 1-heptene, 1-octene, 1-nonene, 1-decene, 4-methyl-1-pentene, 4-methyl-1-hexene, 4,4-dimethyl-1-pentene, 5-methyl-1-heptene, 6-methyl-1-heptene, etc. The third monomeric component may also be a mono unsaturated bridged ring hydrocarbon or halogenated bridged ring hydrocarbon such as the derivatives of bicyclo (2,2,1) heptene. Specific examples of preferred bridged ring compounds of this type are norbornene, 5-chloro-2-norbornene, 7,7-dimethyl-2-norbornene, 5-ethyl-2-norbornene and the like.

The polyene or other ethylenically unsaturated compound containing a plurality of carbon-to-carbon double bonds may be an open chain polyunsaturated hydrocarbon containing 4 to 20 carbon atoms, such as 1,4-hexadiene, monocyclic polyenes and polycyclic polyenes, but it is preferred to make use of a polyunsaturated bridged ring hydrocarbon, such as the polyunsaturated derivatives of bicyclo (2,2,1) heptane wherein at least one of the double bonds is present in one of the bridged rings, such as dicyclopentadiene, bicyclo (2,2,1)hepta-2,5-diene, or alkylidene norbornenes and preferably a 5-alkylidene-2-norbornene wherein the alkylidene group contains from one to 20 carbon atoms and preferably one to eight carbon atoms, or the alkenyl norbornenes, and preferably the 5-alkenyl-2-norbornenes wherein the alkenyl group contains from three to 20 carbon atoms and preferably from three to 10 carbon atoms. Other bridged ring hydrocarbons include polyunsaturated derivatives of bicyclo (2,2,2) octane, as represented by bicyclo (2,2,2) octa-2,5-diene, polyunsaturated derivatives of bicyclo (3,2,1) octane, polyunsaturated derivatives of bicyclo (3,3,1) nonane. At least one double bond is present in the bridged ring of the above compounds and at least one other double bond is present in a bridged ring or in a side chain. Specific examples of preferred bridged ring compounds of the type described above include 5-methylene-2-norbornene, 5-ethylidene-2-norbornene, 5-n-propylidene-2-norbornene, 6-isopropylidene-2-norbornene, 5-n-butylidene-2-norbornene, 6-isobutylidene-2-norbornene, 5-(2-methyl-2-butenyl)-2-norbornene, 5-(3-methyl-2-butenyl)-2-norbornene and 5-(3-dimethyl-4-hexenyl)-2-norbornene. The interpolymer prepared from 5-ethylidene-2-norbornene is greatly preferred since the combination which makes use thereof has outstanding properties and it appears to be somewhat unique by reference to the others.

The fourth monomeric component, the polyene or substituted polyene, may be chemically bound in the interpolymer in an amount within the range of 0.1 to 10 mole percent, and preferably 0.1 to 3 mole percent, or in an amount to provide an actual or calculated unsaturation level of at least two double bonds per 1,000 carbon atoms of the interpolymer chain. However, amounts to provide much higher unsaturation levels are preferred, such as levels of up to 100 double bonds per 1,000 carbon atoms in the interpolymer, and preferably an amount to provide from 2.5 to 30 double bonds per 1,000 carbon atoms, and more preferably 2.5 to 15 double bonds per 1,000 carbon atoms. The specific unsaturation level selected to be introduced by the polyene component will vary depending upon the properties desired in the elastomeric interpolymer that is formed.

The unsaturated organo silane, or second monomer, is employed in the reaction mixture in an amount within the range of more than 0.1 percent but less than 10 percent by weight and preferably in an amount within the range of 1.0 to 5.0 percent by weight of the total monomer system.

Since the allyl and vinyl and the like unsaturated aliphatic halo silanes are slow in the polymerization reaction by comparison with the norbornenyl silanes and are less competitive from the standpoint of reactivity by comparison with the other monomeric components, more of the aliphatic unsaturated silane is used, but only a fraction, such as one-hundredth to one-tenth of the monomer, it is believed, enters into the polymer backbone. On the other hand, the norbornenyl or substituted norbornenyl silanes are sufficiently reactive to compete more favorably with the other monomer components and therefore are preferred for use as the second monomer.

As the second monomer, it is undesirable to make use of an unsaturated silane in which the highly hydrolyzable groups are in the form of an alkoxy or primary or secondary amino groups, such as methoxy or ethoxy or NHR groups, since such oxygen and nitrogen containing groups tend to poison the polymerization catalyst and thus destroy the reactivity necessary for interpolymerization of the monomers. When use is made of unsaturated silanes having highly hydrolyzable halogen or tertiary amino groups as the hydrolyzable groups on the unsaturated silane, such groups can be retained by the second monomer during interpolymerization with the other monomers to become a part of the backbone of the interpolymer.

The interpolymerization of the monomeric components described can be carried out in solution in an inert organic solvent, in the presence of a Ziegler type catalyst, all of which will hereinafter be described.

In the interpolymer of the invention, it is preferred to make use of the first monomer ethylene and the third monomeric component propylene or other $C_3$ to $C_{20}$ monoolefin for copolymerization in the interpolymer in the ratio of 20–95 moles of ethylene to 80–5 moles of the third monomeric component and preferably within the range of 45–90 moles of ethylene to 55–10 moles of propylene, or other third monomeric component.

The polymerization solvent may be any suitable inert organic solvent which is liquid under the reaction conditions such as any prior art solvent useful for solution polymerization of monoolefins in the presence of Ziegler type catalysts. Examples of satisfactory hydrocarbon solvents include acyclic paraffins and olefins containing three to eight carbon atoms, and preferably hexane; aromatic hydrocarbons and preferably aromatic hydrocarbons containing a single benzene nucleus such as benzene, toluene and the like; cyclic hydrocarbons which have a boiling point range approximating that for the straight chain paraffin hydrocarbon and aromatic hydrocarbons discussed above, and preferably cyclic hydrocarbons containing five or six ring carbon atoms; chlorinated hydrocarbons such as carbon tetrachloride, chlorobenzene and tetrachloroethylene. The solvent may be a mixture of one or more of the foregoing hydrocarbons, such as a mixture of aliphatic and naphthenic hydrocarbons, preferably having approximately the same boiling range as normal hexane. It is important for the solvent to be dry and free of substances which will interfere with the Ziegler catalyst to be used in the polymerization process.

Ziegler catalysts, as described in the prior art, may be employed. Such Ziegler catalysts are disclosed in a large number of patents, such as U.S. Pat. No. 2,933,480, No. 3,093,620, No. Nos. No. 3,211,709 and No. 2,113,115. Such Ziegler catalysts generally include metal organic coordination catalysts prepared by contacting a compound of a heavy metal of the groups IV-b to VII-b of the Mendelejeff periodic system of elements, such as titanium, vanadium and chromium halides with an organo-metallic compound of a metal of Groups I to III of the Mendelejeff periodic system which contains at least one carbon-metal bond, such as trialkyl aluminum and alkyl aluminum halides wherein the alkyl groups contain from one to 20 and preferably one to four carbon atoms.

The preferred Ziegler catalyst for the described polymerization is prepared from a vanadium compound and alkyl aluminum halide such as vanadium trichloride, vanadium tetrachloride, vanadium oxychloride, vanadium acetylacetonate, etc., and alkyl aluminum chloride activators having the general formula $R_1AlCl_2$ and $R_2AlCl$, and the corresponding sesqui-chlorides having the general formula $R_3Al_2Cl_3$ in which R is methyl, ethyl propyl, butyl, or isobutyl. In the catalytic system, the aluminum to vanadium mole ratio of the aluminum and vanadium compounds may be within the range of 5–200:1 and preferably within the range of 15–60:1. A catalyst prepared of alkyl aluminum sesquichloride, such as methyl or ethyl aluminum sesquichloride, and vanadium oxychloride is preferred, with the preferred ratio of 1 mole vanadium oxychloride for 5–200 moles of aluminum and preferably for each 15–60 moles of aluminum.

Generally the polymerization reaction may be carried out in a temperature range of −40° to 150° C and preferably within a temperature range of 0° to 60° C during the course of the reaction. The polymerization reaction may be carried out at substantially atmospheric pressure but pressures up to 1,000 psi may be employed.

The polymerization is preferably carried out on a continuous basis in a dry reaction vessel which is closed to the outside atmosphere and which is provided with means for agitation, reactor cooling means, and inlets and outlets for continuously supplying the ingredients of the reaction mixture including the monomer and catalyst, and for continuous withdrawing of the elastomer solution. The polymerization is carried out in a liquid phase in the organic solvent in the presence of the Ziegler cagalyst and the solution of elastomer in the polymerization solvent is withdrawn continuously from the reaction vessel and the cement is then treated with the desired chemical hereinafter described which will react with the hydrolyzable Si-X function to form the uniquely substituted α-olefin interpolymer.

The chemical agents used in the post-reaction with the hydrolyzable Si-Cl or

groups are usually of a nucleophilic nature. Typical chemical groupings are R-OH, R₂NH, R-SH and

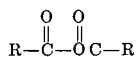

where R can be alkyl or aryl, or where the alkyl or aryl group is substituted with nonprotonaceous substituents such as cyano, aldehydo, keto, tertiary amino, alkoxy and halo. Also certain highly hindered portonaceous substituents such as tertiary alcohols, substituted amines, and substituted phenols may be present on the R group.

It is further to be noted that mixtures of post-treating agents can be used. Also, in some cases it may be advantageous to use two agents in series because certain agents react very slowly with the hydrolyzable Si-X moiety so that only partial interactions take place to leave Si-X sites which upon workup of the polymer will form Si-O-Si crosslinks to give an intractable, crosslinked interpolymer. Therefore, to avoid crosslinking, the residual Si-X groups are terminally treated with a more active agent such as a primary alcohol, preferably methanol, to completely remove crosslinking sites from the modified interpolymer.

Typical post-treatment agents are alcohols such as methanol, ethanol, allyl alcohol, benzyl alcohol, crotyl alcohol 2,2,2-trichloroethanol, 2-cyanoethanol, diacetone alcohol, 4-hydroxy-3,5-di-t-butylbenzyl alcohol, N,N-dimethylethanolamine and the like; amines such as dimethylamine diethylamine, methyl benzylamine and the like; mercaptans such as methyl mercaptan, butyl mercaptan and the like; anhydrides such as acetic anhydride, maleic anhydride, itaconic anhydride, phthalic anhydride and the like.

Any interpolymers of the invention which contain residual unsaturation may be cured in accordance with prior art procedures. As a general rule, a curing procedure which is normally followed in curing unsaturated hydrocarbon rubbers, such as styrene-butadiene rubber, natural rubber, polybutadiene rubber, synthetic polyisoprene rubbers and the like, will be satisfactory. Use may be made of various curing agents in effecting the rapid cure of the interpolymer.

Vulcanization may be achieved with the use of the usual vulcanizing agents such as sulphur, or sulphur bearing compounds which provide sulphur under the vulcanizing conditions. Sulphur is the preferred vulcanizing agent and it is usually used in an amount of about 0.5 to 3 parts by weight per 100 parts by weight of the rubber. Zinc oxide and other metal oxides may be used in an amount of, for example, about 2 to 10 parts by weight per 100 parts by weight of rubber.

Conventional fillers and pigments may be formulated with the interpolymer, such as 10 to 400 parts by weight of carbon black, finely divided silica, esterified silica, titanium dioxide, kaoline and whiting, per 100 parts by weight of rubber. It is also possible to extend the interpolymer with oil such as extender oils as represented by naphthenic oils usually added in an amount of 10 to 300 parts and preferably 20 to 80 parts per 100 parts by weight of rubber.

Vulcanization is accomplished by heating the compounded interpolymer at a vulcanizing temperature for a period of time sufficient for vulcanization, such as at a temperature above 130° C for 10 to 90 minutes, and preferably within the range of 160°–180° C for about 30 minutes.

When carrying out a free radical cure of the interpolymer and compounds formed thereof, a heat activated free radical curing agent is admixed with the interpolymer and the mixture is heated to a sufficiently high temperature to activate the curing agent for cure over a practical period of time. Usually temperature of 50° to 175° C for a period of several minutes to several hours is sufficient. Preferred free radical curing agents include organic peroxides such as dicumene hydroperoxide, dibenzoyl hydroperoxide, cumene hydroperoxide and ditertiarybutylperoxide.

The uncured polymers of this invention may be used in a wide variety of applications where the plastic homopolymers and copolymers of ehtylene are generally used, such as wire coatings, toys, bottles and the like.

The cured polymers and compounds of this invention may be used in a wide variety of articles including tires, belts, hose, tubing and the like.

Having described the basic concepts of the invention, the following examples are given by way of illustration, but not by way of limitation, of the practice of the various concepts of this invention.

EXAMPLE 1

This example illustrates the preparation of an EPDM type interpolymer of the four-monomer component system representing the basic features of this invention and in which use is made of 5-trichlorosilyl-2-norbornene as representative of the second monomer, it being understood that others of the described silylnorbornenes, alkyl substituted halosilyl norbornenes or allyl and vinyl silanes may be used instead of the 5-trichlorosilyl-2-norbornene.

A dry, 7-ounce flask containing 100 cc of dry hexane was flushed with nitrogen gas and was fitted with a self-sealing syringe cap. The hexane was flushed with propylene and then pressured to 15 pounds per square inch with propylene. The flask was brought to 25 pounds total monomer pressure by addition from a feed tank containing 65 mole percent ethylene and 35 mole percent propylene. The polymerization was performed in a 35° C water bath. To the flask was added 0.02 mM of butyl perchlorocrotonate, 0.05 mM of 5-trichlorosilyl-2-norbornene, 0.15 mM of ethyl aluminum sesquichloride and 0.00375 mM of vanadium oxychloride. As the polymerization proceeded, the monomer composition was maintained constant by continual addition from the feed tank. At 300 and at 600 seconds, the above reactants were again charged to the flask. At 900 seconds the polymerization was stopped by treating the cement with one ml of water. Irganox 1010, a pentaerythritol ester having the general formula

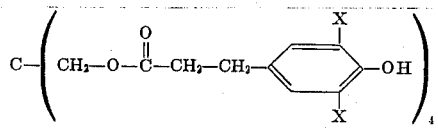

(an antioxidant of Geigy Chemical Company) was added. At this time, the solution became thick and jelly like and polymer started to come out of solution. The polymer was recovered by steam coagulation and dried in a vacuum oven at 75° C. The resulting polymer (5.0 g) was extremely tough and did not press into a film in a Carver press at 180° C due to the siloxane crosslinking.

EXAMPLE 2

Example 1 was repeated except that the 5-trichlorosilyl-2-norbornene was substituted by an equivalent amount of a silane having the formula $R'SiR_nX_{3-n}$ in which $n$ is 1 or 2, $R'$ is a norbornenyl or an alkyl substituted norbornenyl of the type previously described, R is an alkyl or halogen substituted alkyl group such as methyl, ethyl, n-propyl, isopropyl, n-pentyl, trichloromethyl, 2,3-dibromopropyl, or trichloromethylpropyl, or an aryl, phenyl, or alkaryl or a halogen substituted arylphenyl or alkaryl group, as previously described, and X is a highly hydrolyzable group such as halogen, or tertiary amino group.

The unsaturated silane, identified as the second monomer, is believe to enter into the interpolymerization reaction with the other monomers through the unsaturated carbon-to-carbon linkage of the organic group that is attached to the silicon atom. Under such circumstances, the organo silicon component, which forms a part of the interpolymer backbone molecule, continues to retain the 1 to 3 highly hydrolyzable groups, such as the chlorine, bromine, tertiary amino groups and the like. The highly hydrolyzable groups, present on the organo silicon segment of the interpolymer, remain hydrolyzable and highly reactive in the formed interpolymer.

Novel concepts of this invention reside not only in the new and improved interpolymer that is formed and in its method of manufacture, but also in the further processing of the highly hydrolyzable groups of the interpolymer from which a number of new an novel compositions and products can be prepared as well as the method for the manufacture of same. For example, primary alcohols, when reacted with the interpolymer, as by addition to the cement, are effective to substitute the OR group of the alcohol for the hydrolyzable group. Such substituted OR groupings are not readily hydrolyzable in water or other active hydrogen containing materials so that the reacted interpolymer can subsequently be treated in aqueous medium without crosslinking and the like. This enhances the handling of the interpolymer where otherwise the reaction with water or other active hydrogen containing materials results in three-dimensional intractable, crosslinked interpolymers, as shown in Example 1.

Suitable primary alcohols can be represented by the general formula $R\ CH_2OH$ in which R is hydrogen or a $C_1$–$C_{14}$ straight or branched chain, saturated or unsaturated, substituted or unsubstituted alkyl or aryl hydrocarbon such as methanol, ethanol, allyl alcohol, neopentyl alcohol, benzyl alcohol, crotyl alcohol and the like.

The following example will illustrate the treatment of the interpolymer with a primary alcohol to produce a noncrosslinked interpolymer.

EXAMPLE 3

Polymerization was carried out as in Example 1 except that instead of stopping the polymerization with water, the polymerization was stopped with 2 cc of methanol. After reacting with the methanol for about one hour, the polymer cement was washed with water without noticeable crosslinking. The product was recovered by steam coagulation and dried in a vacuum oven at 75° C. The resulting polymer was soft and pliable and could be pressed to a smooth thin film, between the plates of a Carver press under the conditions as in Example 1.

When the alcohol with which the interpolymer of this invention is treated is an unsaturated alcohol, as represented by the general formula ROH in which R is represented by the formula $R'-CH=CH-R'-CH_2-$ in which $R'$ is hydrogen or a $C_1$–$C_8$ substituted or unsubstituted hydrocarbon in the form of an aliphatic, aryl, alkaryl, heterocycle or other ring structure, such as allyl alcohol, crotyl alcohol, undecenyl alcohol, norbornenyl alcohols and the like, the OR grouping, which substitutes for the hydrolyzable groups attached to the silicon atom in the interpolymer chain, adds unsaturated or olefinic sites to the interpolymer to enhance cure or sulphur vulcanization of the interpolymer.

This same concept for introducing unsaturated olefinic groups for cure of the interpolymer by reaction of an unsaturated alcohol for substitution of the hydrolyzable groups attached to the silicon atom of the interpolymer can also be employed as a means for achieving cure or sulphur vulcanization of ethylene-propylene-silane interpolymers in the absence of the polyene fourth monomer. For this purpose, the interpolymer is prepared in the usual manner of the monomers ethylene, a monoolefin containing from three to 20 carbon atoms, preferably propylene, and an unsaturated organo silane of the type previously described, in the same ratios, the same catalysts and the same conditions previously described for preparation of the interpolymer, and then reacting the formed interpolymer with an unsaturated alcohol to substitute the unsaturated OR group of the alcohol for the hydrolyzable group attached to the silicon atom in the interpolymer, thereby to incorporate unsaturated groupings into the interpolymer to produce a curable or sulphur vulcanizable compound.

The following example will illustrate the treatment to react the interpolymer with an unsaturated alcohol to produce a sulphur curable rubber;

EXAMPLE 4

Polymerization was carried out as in Example 1 except that to the flask there was added 0.03 mM of butyl perchlorocrotonate, 0.04 mM of pyridine, 0.375 mM of nonbornenyl trichlorosilane, 0.3 mM of ethyl aluminum sesquichloride and 0.0075 mM of vanadium oxytrichloride. As the polymerization proceeded, the monomer composition was maintained constant by continual addition from the feed tank. At 300 seconds and again at 600 seconds, the above reactants were again charged to the flask. At 900 seconds, 0.3 cc of pyridine and 4 cc of allyl alcohol were added. The flask was agitated for two hours and charged with 4 cc of methanol. After 20 minutes of agitation, 1 cc of water and 0.005 gram of Irganox 1010 were added. The flask was vented and the contents blended with water to remove catalyst residues.

The polymer was recovered by precipitation from solution with isopropanol and redissolved in hexane. After recoagulation with isopropanol, the polymer was dried in vacuum at 80° C. The resulting polymer (4.2 grams) was gel-free and analyzed to contain 1.7 C=C/1000 C, as determined by titration with bromine.

EXAMPLE 5

The procedure is the same as that of Example 4 except that 4 mM of 5-ethylidene-2-norbornene is added with the perchlorocrotonate, norbornenyl trichorosilane and catalyst to produce the tetrapolymer of this invention followed by treatment with allyl alcohol to substitute the allyl group for hydrolynzable halogen groups attached to the silicon atom of the interpolymer to produce a sulphur curable rubber having more than 5 C=C/1000 C, as determined by titration with bromine.

By way of further modication, the alcohol reacted with the interpolymer of this invention can be one or more halogen substituted alcohols in which the R' group in the foregoing general formula is substituted with one or more halogen groups, such as chlorine, bromine and iodine. In this manner, halogen containing groups can be substituted for the hydrolyzable groups attached to the silicon atom in the polymer thereby to increase the fire and chemical resistance properties of the interpolymer that is produced. Representative of such halogenated alcohols which may be used in the practice of this phase of the invention are ROH compounds in which the R group is a halogenated, saturated or unsaturated, organic group of from one to 18 carbon atoms in the form of an aliphatic, aromatic, mixed aliphatic aromatic, heterocyclic and the like grouping, such as hexachloronorbornenylmethanol, 2,2,2-trichloroethanol and the like.

The following example is given by way of illustration of this concept of the invention:

EXAMPLE 6

The reaction of Example 4 was repeated except that 10 grams of 1,2,3,4,7,7-hexachloronorbornene-2-methanol-5 was substituted for the allyl alcohol in the reaction with the formed interpolymer.

After purification and drying, the interpolymer gave a chlorine analysis of 0.59 percent by weight chlorine. The resulting interpolymer in the form of an elastomer could have a number of unique properties.

By way of further concept of this invention, the alcohol used to substitute the OR groups for the highly hydrolyzable group attached to the silicon atom of the formed interpolymer may be an alcoholic or phenolic antioxidant whereby the OR group which becomes bound to the interpolymer constitutes an antioxidant which now forms a part of the rubber molecule or interpolymer. Such alcoholic or phenolic antioxidants may be represented by the general formula

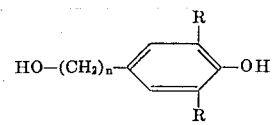

in which $n$ is a number of from 1 to 11 and R is a hydrogen or a $C_3$–$C_9$ branched hydrocarbon, such as t-butyl, isobutyl and the like.

It is sufficient to render the interpolymer substantially resistant to deterioration by oxidation when the amount of alcoholic or phenolic antioxidant reacted with the interpolymer is within the range of 0.01 to 5 parts by weight per 100 parts by weight of interpolymer and preferably in an amount within the range of 0.1 to 1.5 parts by weight per 100 parts by weight of the interpolymer.

EXAMPLE 7

The reaction is the same as that of Example 4 except that the allyl alcohol is substituted by 0.5 part by weight per 100 parts by weight rubber of the antioxidant represented by the first of the above formulae in which R is tertiary butyl and $n$ is 1.

The interpolymer that is formed represents an elastomer having improved oxidation resistance.

The interpolymers produced in accordance with Examples 3 through 7 can be used as adhesives for metal, paper, plastics, rubber, natural or synthetic fibers, or they may be used as films or binders for dyes, filaments, pigments, fillers and the like.

Secondary or tertiary alcohols for steric reasons are not effective for removal of the highly hydrolyzable groups from the organo silicon segment of the formed interpolymer. As a result, such secondary or tertiary alcohols can be used effectively to kill the catalyst without causing significant post-jumping of the interpolymer to increase molecular weight by crosslinking or loss of hydrolyzable SiX group. Representative of such secondary or tertiary alcohols are alcohols having the general formula $R_2CHOH$ or $R_3COH$, in which R is a $C_1$–$C_8$ straight or branched chain, saturated or unsaturated, substituted or unsubstituted, alkyl or aryl group, such as isopropanol, sec-butanol, t-butanol and the like. This can be illustrated by the following example.

EXAMPLE 8

It was noted in Example 1 that extreme gel formation took place almost immediately upon addition of the water. The polymerization was repeated but, instead of treating the polymer solution with water, one ml of dry isopropanol was added. It was observed that even upon prolonged agitation of the isopropanol-cement solution, no gel formed. However, upon subsequent coagulation of the polymer with steam and the drying of the polymer, excessive crosslinking took place. Therefore, a considerable number of chlorine-silicon bonds must have remained after the isopropanol treatment to subsequently hydrolyze to give the siloxane crosslinking. The polymer was very tough and would not press a smooth film in a Carver press at 180° C.

It has been found, in accordance with a further concept of this invention, that other high molecular weight compounds, polymers, copolymers or interpolymers containing a free amino and/or hydroxyl grouping can be grafted onto the interpolymer of this invention by way of the highly hydrolyzable group attached to the silicon atom in the backbone of the interpolymer whereby the amino or hydroxyl group reacts to hydrolyze off the hydrolyzable group and substitute the corresponding high molecular weight compound, polymer, copolymer or interpolymer as a graft onto the backbone of the interpolymer.

For example, the interpolymer containing the SiX grouping in the chain can be interacted with cellulosic, alkyd, polyester, polyamide or polyether fibers or resins for linking the latter molecular onto the interpolymer by interaction between the SiX of the interpolymer with the hydroxyl or amino group of the fiber or resin as represented schematically by the following equation:

R-Si-X + R'-CH$_2$OH → R-Si-O-CH$_2$-R' where R' is cellulosic, polyester, etc., and R is $\alpha$-olefin polymer.

Similarly, organo silicon polymers and copolymers in the form of polysiloxanes containing free hydroxyl groups such as SiOH may be interacted with hydrolyzable groups attached to the silicon atom of the interpolymer to graft the polysiloxane onto the interpolymer to form an integral part thereof.

Similarly, polyethers having free hydroxyl groups as represented by the formula

HO-(-CH$_2$-CH$_2$-O-)$_n$-CH$_2$-CH$_2$-OH ;

hydroxyl terminated polybutadienes as represented by the general formula

HO-(CH$_2$-CH=CH-CH$_2$)$_n$-OH ;

hydroxyl terminated polystyrene having the general formula $$HO-\left[-CH-CH_2-\right]_n-OH$$
$$\phantom{HO-\left[-}C_6H_5\phantom{-CH_2-\right]_n-OH}$$

or polyurethanes having free hydroxyl or amino groups may be grafted onto the interpolymer by replacement of highly hydrolyzable groups attached to the silicon atom of the interpolymer.

By reason of the interaction between the interpolymer and the fibers or resins of cellulose, polyamide resins, polyester resins, alkyd resins, silicone resins, polyethers, polybutadiene, polystyrenes and polyurethanes of the type described, it is possible to establish a strong and permanent interbonded relationship by reason of the interaction between such high molecular weight polymeric or copolymeric materials and the interpolymer.

EXAMPLE 9

A dry flask was first flushed with nitrogen gas and filled with 100 cc of dry tetrachloroethylene, flushed with polymerization grade propylene and pressured to 14 psig with propylene. The flask was brought to 25 psig total molecular pressure by addition from a feed tank containing 65 mole percent ethylene and 35 mole percent propylene. Polymerization was carried out in a water bath maintained at 35° C. Addition was made to the flask of the following reactants: 0.4 mM 5-ethylidene-2-norbornene, 0.03 mM butyl perchlorocrotonate, 0.04 mM of pyridine, 0.375 mM norbornenyl trichlorosilane, 0.3 mM ethyl aluminum sesquichloride and 0.0075 mM vanadium oxytrichloride.

As the polymerization proceeded, the monomer composition in ethylene and propylene was maintained constant by continuous addition from the feed tank. At 300 seconds and again at 600 seconds, the above reactants were again charged to the flask and at 900 seconds, 0.3 cc pyridine was added. The monomers were vented and the resulting cement was flushed with nitrogen. The interpolymer, in solution in the cement, contained about four carbon-to-carbon double bonds ( -C=C-) per 1000 carbon atoms.

Rayon cord was passed through the cement and then through a drying oven at 400°F. The rubber impregnated cord was pressed between two layers of standard EPDM rubber (EPsyn 40 of Copolymer Rubber & Chemical Corporation), containing a sulphur system for cure. The composition was cured and standard H-adhesion tests were performed. An average of 16 tests gave an H-adhesion value of 14.4.

An EPDM cement similar to the one above was prepared, but without the norbornenyl trichlorosilane. The cement was post-treated and handled exactly as described above. An average of 11 pulls gave an H-adhesion value of 9.8.

In accordance with a further novel concept of the invention, it has been found that treatment of the interpolymer with a tertiary amine, such as pyridine, prior to interaction with the alcohol or with an anhydride, amine or phenol, as hereinafter described, is effective to increase the amount of substitution of the respective grouping for the hydrolyzable group that remains attached to the silicon atom of the formed interpolymer. This unique concept for activation to increase the amount of substitution or graft can be illustrated by the following examples.

EXAMPLES 10–12

Three polymerizations were performed in the manner described in Example 4 except that each charge contained 0.03 mM butylperchlorocrotonate, 0.04 mM pyridine, 0.375 mM norbornenyl trichlorosilane, 0.3 mM ethyl aluminum sesquichloride and 0.0075 mM vanadium oxytrichloride. The polymerization solutions were treated with different levels of pyridine before treatment with 4 cc allyl alcohol and then subsequently 4 cc of methanol, with the following results:

| Pyridine Level | C=C/1000 C in Polymer |
|---|---|
| 0 | 0.87 |
| 0.3 cc | 1.17 |
| 0.9 cc | 1.51 |

From the above, it will be apparent that a tertiary amine such as pyridine catalyzes the reaction between the alcohol group and the halogen group that remains attached to the silicon atom of the interpolymer to increase the amount of substitution.

It has been found that interation of the interpolymer with an alcohol or other compound of the type herein described for substitution of hydrolyzable groups attached to the silicon atom of the interpolymer does not always effect complete removal of the halogen or other hydrolyzable group. That which remains in the interpolymer might interfere with the use to be made of the interpolymer or effect undesirable reactions of the interpolymer such as crosslinking. Thus it is a further object of this invention to provide a means for effecting removal of the remaining halogen or other hydrolyzable groups or to effect their inactivation after the interpolymer has been treated with the desired alcohol, amine, anhydride, or phenol to bring about the desired substitution.

An important concept of this invention therefore resides in the stabilization of the interpolymer to prevent post-reaction stemming from hydrolyzable groups remaining after the interpolymer has been treated with an alcohol or other compound for substitution of the hydrolyzable groups attached to the silicon atom in the interpolymer. It has been found that post-treatment with methanol, or to a lesser extent with a higher primary alcohol, will substantially effect complete removal of any halogen or other hydrolyzable groups remaining in the interpolymer so that they will not be available for undesirable post-reactions and so that the resulting compound will be stable.

The foregoing may be illustrated by the following examples:

EXAMPLE 13

The polymerization was carried out in the manner described in Example 4. After polymerizing for 900 seconds, the cement was treated with 0.33 cc of dry pyridine and 2 cc of hexachloronorbornenyl methanol. After shaking for 20 minutes, 5 cc of water and 0.05 gram of Irganox 1010 were added. The cement was water washed and steam coagulated. After drying in an oven at 80° C, the resulting polymer was found to be extremely tough and insoluble and incapable of being pressed into a film in a hot Carver press.

EXAMPLE 14

The same polymerization was performed as in Example 13 but, in this example, 4 cc of methanol was added after the 20 minute exposure to the hexachloronorbornenyl methanol. After reacting 20 minutes with methanol, the cement was treated as in Example 13. The resulting polymer was soft, soluble in hexane and was capable of being pressed into a smooth thin film on a hot Carver press.

The foregoing indicates that without terminal treatment with methanol, the interpolymer still contained reactive chlorine groups which permitted cross polymerization when the interpolymer was subsequently contacted with water and/or steam for coagulation whereas such reactive chlorine groups were removed by the methanol in Example 14 to avoid the problem of crosslinking to an insoluble polymer during the coagulation step.

In the same manner, the polymer can be reacted with allyl alcohol for substitution of only a small portion of the halogen groups attached to the silicon atoms of the interpolymer and then terminally reacting the product with methanol to remove the remaining halogens to produce a rubber that will not pre-cure or crosslink, as in Example 13, so that the resulting elastomer can be processed in the usual manner and subsequently cured.

In somewhat the same manner as the alcohol hydrolysis of halogens attached to the silicon atom of the formed interpolymer, the halogen or other hydrolyzable group can be replaced by interaction between the formed interpolymer and organic anhydride, primary or secondary amine compounds, hydroxyl compounds such as phenols, and other active hydrogen containing compounds having an active hydrogen group which is effective in removing the halogen to form the corresponding hydrogen halide while the residue replaces the halogen formerly attached to the interpolymer.

In this manner chlorendic anhydride can be substituted for the hydrolyzable group into the interpolymer to improve flame resistance of the interpolymer; maleic anhydride or acetic anhydride can be tied into the interpolymer to produce an elastomer having improved characteristics and to provide an elastomer that can be further polymerized by condensation polymerization.

Primary amines and ammonia inter-react in a manner similar to water to kill the catalyst and bring about the molecular jump by crosslinking while secondary amines form addition products by substitution for hydrolyzable groups attached to the silicon atom, but do not effect crosslinking.

The reaction with alcohol, anhydrides or phenols appears to be catalyzed by tertiary amines, such as pyridine, as previously described, to increase the amount of substitution. Instead of, or in addition to, the pyridine or other tertiary amine may function as scavengers for the hydrogen halide or other hydrolyzable group that is released upon detachment of the chlorine from the silicon atom.

The following example will illustrate the post-reaction of the interpolymer with an amine to effect substitution into the interpolymer:

EXAMPLE 15

A polymerization was carried out as described in Example 4. The polymerization was treated at 900 seconds with 4 cc of dry diphenyl amine. After 20 minutes of shaking, the cement-amine solution was further treated with 4 cc of methanol. After 20 minutes, 1 cc of water and 0.005 gram of Irganox 1010 was added. The cement was washed with water and steam coagulated. The resulting polymer was purified by redissolving in hexane and coagulating with isopropanol. The polymer was dried in a vacuum at 80° C to yield a product containing 0.086 percent by weight nitrogen as determined by elemental analysis. This is equivalent to an incorporation of 0.86 moles of diphenyl amine per 1,000 carbon atoms.

Such modified interpolymers should be more highly receptive to dye coloring by comparison with the same interpolymer without the attached amine groups.

Similar concepts relying on interaction between hydroxyl or amino groups with highly hydrolyzable groupings attached to the silicon atom of the interpolymer can be used to include into the interpolymer certain dye compounds having free hydroxyl groups as represented by

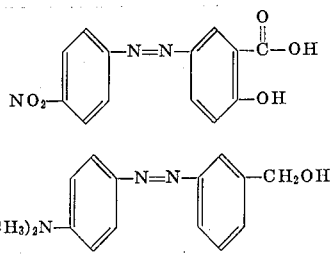

When tied in to form a part of the molecule, such dye compounds operate permanently to impart dye color to the interpolymer that is formed. The color resists removal by washing or drycleaning.

CONCLUSION

It will be apparent from the foregoing that we have provided a new and novel interpolymer and method for the preparation of same and an interpolymer which is capable of numerous modifications by reaction with components thereof to produce new and novel products and methods for the preparation of same.

It will be understood that changes may be made in the details of formulation and operation without departing from the spirit of the invention, especially as defined in the following claims.

We claim:

1. An interpolymer which is the product of the interpolymerization of an ethylenically unsaturated organosilane having the general formula $R_nSiX_{4-n}$ in which X is a highly hydrolyzable group which does not contain an oxygen group, R is a group selected from the group consisting of hydrogen, alkyl, aryl, alkaryl, arylalkyl, cyclic or heterocyclic group in which at least one of the R groups contains an unsaturated carbon to carbon linkage and an olefin selected from the group consisting of (1) ethylene, (2) a monoolefin having from three to 20 carbon atoms and (3) a polyene and mixtures thereof in which at least ethylene is present as a monomer, in which at least one hydrolyzable X group remains attached to the silicon atom in the product that is formed, and in which at least one of the remaining hydrolyzable X groups is replaced by a nucleophilic group substituted therefor after the product is formed.

2. An interpolymer as claimed in claim 1 which includes at least one monoolefin having from three to 20 carbon atoms.

3. An interpolymer as claimed in claim 1 which includes a polyene.

4. An interpolymer as claimed in claim 1 in which the olefinic monomers include ethylene, at least one monoolefin containing three to 20 carbon atoms, and a polyene.

5. An interpolymer as claimed in claim 1 in which the unsaturated organo silane is selected from the group consisting of the vinyl, allyl, crotyl, divinyl, diallyl, dicrotyl and styryl trihalo and dihalo silanes.

6. An interpolymer as claimed in claim 1 in which the unsaturated group of the unsaturated organo silane is a norbornenyl group.

7. An interpolymer as claimed in claim 1 in which the monoolefin is propylene.

8. An interpolymer as claimed in claim 1 in which the polyene is a polyunsaturated bridged ring hydrocarbon or a halogenated polyunsaturated bridged ring hydrocarbon.

9. An interpolymer as claimed in claim 8 in which the polyene is an alkylidene-norbornene.

10. An interpolymer as claimed in claim 9 in which the aliylidene-norbornene is 5-ethylidene-2-norbornene.

11. An interpolymer as claimed in claim 1 in which the hydrolyzable X groups attached to the silicon atoms in the product are replaced by OR groups of an alcohol.

12. An interpolymer as claimed in claim 1 in which the hydrolyzable X groups attached to the silicon atoms in the product are replaced by halogenated alkoxy groups.

13. An interpolymer as claimed in claim 1 in which the hydrolyzable X groups attached to the silicon atoms in the product are replaced by dye groups to produce a permanently colored interpolymer.

14. An interpolymer as claimed in claim 1 in which any residual hydrolyzable X groups remaining after the primary post-reaction are replaced by alkoxy groups.

15. The method which comprises the interpolymerization in solvent solution in the presence of a Ziegler type catalyst of an ethylenically unsaturated organo silane having the general formula $R_nSiX_{4-n}$ in which X is a highly hydrolyzable group other than an oxygen containing group, R is a group selected from the group consisting of hydrogen, alkyl, aryl, alkaryl, arylalkyl, cyclic or heterocyclic group in which at least one of the R groups contains an unsaturated carbon to carbon linkage, and olefinic monomers selected from the group consisting of (1) ethylene, (2) a monoolefin having from three to 20 carbon atoms and (3) a polyene, but in which at least ethylene is present as a monomer, and in which where both ethylene and the monoolefin are present the ethylene and monoolefin are present in the mole ratio of 20-95 moles ethylene to 80-5 moles monoolefin, and when the polyene is present the polyene is present in an amount within the range of 0.1 to 10 mole percent and the unsaturated organo silane is present in an amount within the range of 0.1 to 10 percent by weight, and then reacting the product to effect substitution of a nucleophilic group for at least one of the hydrolyzable X groups which remains attached to the silicon atoms in the interpolymer that is formed.

16. The method as claimed in claim 15 in which the monoolefin is propylene and in which the ethylene and propylene are reacted in the interpolymerization mixture in the ratio of 45-90 moles of ethylene to 55-10 moles of propylene, the polyene is present in an amount within the range of 0.1 to 3 moles and the unsaturated organosilane is present in an amount within the range of 1 to 5 percent by weight.

17. The method as claimed in claim 15 in which the unsaturated organosilane is selected from the group consisting of the vinyl, allyl, crotyl, divinyl, diallyl, dicrotyl and styryl trihalo and dihalo silanes.

18. The method as claimed in claim 15 in which the unsaturated group of the organosilane compound is a norbornenyl group.

19. The method as claimed in claim 15 in which the olefinic monomer comprises both ethylene and polyene.

20. The method as claimed in claim 15 in which the olefinic monomers comprise ethylene and at least one monoolefin.

21. The method as claimed in claim 15 in which the product is reacted with an alcohol to replace hydrolyzable X groups attached to silicon atoms in the interpolymer with organic OR groups of the alcohol.

22. The method as claimed in claim 21 in which the alcohol is an unsaturated alcohol which increases the amount of unsaturation in the formed interpolymer.

23. The method as claimed in claim 21 in which the alcohol is a halogenated alcohol.

24. The method as claimed in claim 15 in which the post-reaction comprises adding a secondary or tertiary alcohol to the solution following polymerization to kill the catalyst while still leaving hydrolyzable groups attached to the silicon atom in the interpolymer.

25. The method as claimed in claim 15 in which the interpolymer is reacted with a dyestuff having free amino or hydroxyl groups to substitute the dye group for hydrolyzable groups attached to the silicon atoms.

26. The method as claimed in claim 15 which includes the step of killing the catalyst without removal of hydrolyzable groups attached to the silicon atom of the formed interpolymer before reacting the interpolymer for replacement of hydrolyzable groups attached to the silicon atom.

27. The method as claimed in claim 15 which includes the step of further reacting the reaction product with a primary alcohol to hydrolyze off any hydrolyzable X groups that remain attached to the silicon atoms of the interpolymer after the first post-reaction.

* * * * *

UNITED STATES PATENT OFFICE
CERTIFICATE OF CORRECTION

Patent No. 3,764,589         Dated  October 9, 1973

Inventor(s) William C. Bond, Jr. et al.

It is certified that error appears in the above-identified patent and that said Letters Patent are hereby corrected as shown below:

column 3, line 6, change "6-isopropylidene" to 5-isopropylidene; line 7, change "6-isobutylidene" to 5-isobutylidene;

colum4, line 38, cancel "Nos." and insert --- 3,093,621; line 39, change No. 2,113,115 to No. 3,113,115.

Signed and sealed this 16th day of April 1974.

(SEAL)
Attest:

EDWARD M. FLETCHER, JR.       C. MARSHALL DANN
Attesting Officer      Commissioner of Patents